United States Patent [19]
Watanabe et al.

[11] Patent Number: 4,540,205
[45] Date of Patent: Sep. 10, 1985

[54] UNION JOINT

[75] Inventors: Nobuyuki Watanabe; Nobuo Wanda, both of Kuwana, Japan

[73] Assignee: Hitachi Metals, Ltd., Tokyo, Japan

[21] Appl. No.: 502,635

[22] Filed: Jun. 9, 1983

[30] Foreign Application Priority Data

Jun. 11, 1982 [JP] Japan .............................. 57-86869[U]

[51] Int. Cl.³ ............................................. F16L 19/02
[52] U.S. Cl. .................................. 285/329; 285/334.1; 285/334.4; 285/354
[58] Field of Search .................. 285/334.1, 334.5, 354, 285/329, 379, 334.4

[56] References Cited

U.S. PATENT DOCUMENTS

| | | | |
|---|---|---|---|
| 484,843 | 10/1892 | Bavier | 285/334.4 X |
| 494,801 | 4/1893 | Weber | 285/354 X |
| 959,702 | 5/1910 | Blanchard et al. | 285/329 |
| 1,137,113 | 4/1915 | Bouchard | 285/354 X |
| 1,523,817 | 1/1925 | Long | 285/329 X |
| 1,968,562 | 7/1934 | Lofgren | 285/329 |
| 2,850,303 | 9/1958 | Bauer | 285/354 X |

Primary Examiner—Thomas F. Callaghan
Attorney, Agent, or Firm—Antonelli, Terry & Wands

[57] ABSTRACT

A union joint for jointing pipes comprises a union head having a male screw thread formed on the outer peripheral surface of an axial inner end portion thereof and provided at its end with a seat member made of a non-ferrous material, a union tail piece having a collar on the outer peripheral surface of the inner axial end thereof and provided at its end with a sealing surface constituted by a part of a sphere having an arcuate axial cross-section, and a union nut provided at its front inner portion with a female screw thread and at its rear portion with an inwardly projecting jaw. An annular groove is formed in the axially inner end portion of the union head adjacent to the inner periphery of the union head, the annular groove having a substantial axial depth and receiving a substantially ring-shaped seat member, the inner wall of the union head defining the annular groove being knurled and flared at at least the end portion thereof over the entire circumference thereof and caulked onto the seat member. The seat surface of the seat member for contact with the sealing surface on the union tail piece being tapered to diverge towards the axially inner end at a taper angle of between 95° and 110°.

1 Claim, 11 Drawing Figures

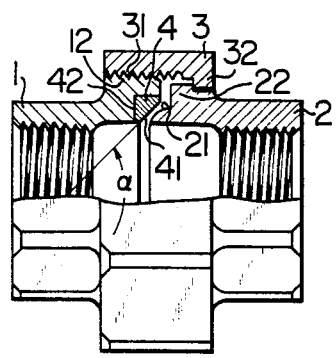
FIG. 1 PRIOR ART
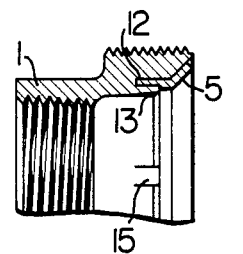
FIG. 2 PRIOR ART
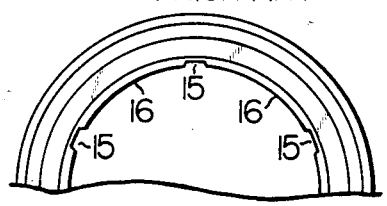
FIG. 3 PRIOR ART
FIG. 4
FIG. 5
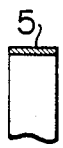
FIG. 6
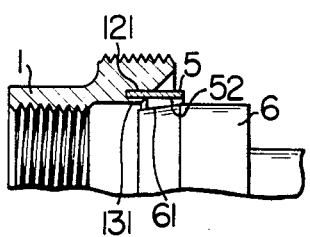

UNION JOINT

BACKGROUND OF THE INVENTION

The present invention relates to a brass seat union for use in a screw type pipe joint.

Pipe joints of union type construction are used in the portions of the piping arrangement where the disconnection of pipes is necessary, e.g. connections to equipments or machines. In some of the known pipe joints of union type construction, a brass seat member is beforehand attached to the end of the union head in order to eliminate the necessity for the renewal of gaskets and/or additional tightening of the nuts.

FIG. 1 shows a conventional brass seat union joint in which a seat member receiving recess 42 for receiving a seat member 4 is formed in the forward end of a union head 1 as viewed in FIG. 1. The term "forward end" is to be understood here as being the right-side end of the union head 1 opposing the union tail piece 2. The seat member 4 is formed by casting, die casting or cutting from a round bar, to have a comparatively large thickness and an outside diameter which is within the tolerance of shrink fit to the inside diameter of the seat member receiving recess 42. The seat member 4 is then driven into the seat member receiving recess and, thereafter, the surface of the seat member 4 which is to be contacted by the sealing surface 21 of a union tail piece 2 is finished to form a sealing surface. The union head 1 and the union tail piece 2 are provided at their axially outer portions with internal threads for engaging the screw threads on the pipes. The sealing surface 21 is formed on the axially inner end portion of the union tail piece 2 to have an arcuate crosssection in the axial direction and presenting the form of a part of a sphere. A union nut 3 is provided at its inner rear portion with an inward projecting jaw 32 which is adapted to engage with a flange 22 of the union tail piece 2. In use, the union nut 3 is tightly screwed onto the union head 1, through a screwing engagement between the female screw thread 31 in the inner peripheral surface of the front end portion of the union nut 3 and a male screw thread formed on the outer peripheral surface of the axially inner end portion of the union head 1, so that the sealing surface 21 on the union tail piece 2 is strongly pressed against the sealing surface 41 of the union head to provide a tight seal against any leak of the internal fluid. The disconnection can easily be made by unscrewing the union nut 3.

This known brass seat union joint, however, suffers from the following problem. Namely, it is often experienced that the seat member 4 is damaged at its outer peripheral surface when the same is forcibly driven into the seat member receiving portion 42. The use of such a damaged seat member may cause a leak of the internal fluid through the back surface of the seat member 4, i.e. along the surface of the seat member receiving recess 42, and then through the damaged outer peripheral surface of the seat member 4. This leak of fluid, therefore, will be referred to as "back side leak", hereinunder. The leak of the internal fluid may be caused also by a too loose fit between the outer peripheral surface of the seat member 4 and the inner peripheral surface of the seat receiving recess 42. Thus, the union joint of the type described involved a fear of leak of internal fluid, however tight the seal provided by the sealing surfaces 21 and 41 may be. In addition, there is a large fluctuation in the sealing performance because the sealing performance is largely affected by the precision of machining of the sealing surfaces 41 and 21.

FIGS. 2 and 3 designate another example of the known brass sheet union joint. This brass sheet union joint has a union head 1 provided with an annular groove 12 adapted to receive a sheet member 5 having a cylindrical ring-like form as shown in FIG. 5. Then, the inner peripheral wall 13 of the union head 1 is deformed radially outwardly at several portions along the circumference thereof as at portions 15 thereby to fix the seat member 5. In this brass seat union joint, the inner peripheral surface 13 of the union head 1 is deformed only at several portions 15 along its circumference, so that tensile force is applied to other portions 16 of the inner peripheral surface 13, so that the inner peripheral surface 13, which initially has a cylindrical form, tends to be deformed into a polygonal shape having a plurality of substantially curvilinear sides interconnecting adjacent deformed portions 15. Therefore, even though the seat member 5 closely fits in the annular groove 12 in a fluid tight manner, the inner peripheral surface 13 is deflected into the polygonal shape as a result of deformation thereof at the portions 15 to undesirably leave gaps between the wall of the annular groove 12 and the seat member 5, resulting in an external leak of the fluid through such gaps. Furthermore, the portions 15 are often cracked because such portions are deformed by a large force to tightly hold the seat member 5, so that the leak of the fluid is allowed also through such cracks.

Referring again to FIG. 1, the angle α of taper of the sealing surface 21 on the union head 1 with respect to the axis is usually 90° in the known joint. In some joints for specific uses which is out of the scope of the invention, the angle of taper is smaller than 90°.

The inventors have found, through various studies, that a taper angle greater than the conventional value of 90° can provide a higher sealing effect for a given tightening torque applied to the nut 3, provided that the radius of sphere part constituting the sealing surface 21 of the union tail pieces 2 is constant. This fact was proved both experimentally and theoretically for all joints having an equal radius of sphere part constituting the sealing surface 21 on the union tail piece 2.

SUMMARY OF THE INVENTION

Accordingly, an object of the invention is to provide a union joint having a superior and stable sealing performance, without suffering from leaks such as the back side leak through seat fixing areas other than the sealing surface of the seat member.

To this end, according to the invention, there is provided a union joint comprising a union head having an axially outwardly directed annular groove formed in the axially inner end portion of the inner peripheral surface thereof, the larger diameter side of said groove being cylindrical and the smaller diameter side thereof being inclined toward the inner periphery and a ring-shaped seat member fitted in the annular groove, wherein at least the end portion of the inner peripheral wall defining the annular groove is expanded radially outwardly over its entire circumference and caulked onto the seat member by means of forming knurlings on an inner peripheral side of the inner wall of the annular groove over its whole circumference, and wherein an angle of the annular seat member's surface contacting the sealing surface of a union tail piece is formed in a taper angle of between 95° and 110° diverging toward the axially inner end of the union head.

The above and other objects, features and advantages of the invention will become clear from the following description of the preferred embodiments taken in conjunction with the accompanying drawings.

BRIEF DESCRIPTION OF THE PREFERRED EMBODIMENTS

FIG. 1 is a partly-sectioned side elevational view of a conventional union joint;

FIG. 2 is a sectional view of a part of another known union joint;

FIG. 3 is a right-side elevational view of the part of union joint as shown in FIG. 2;

FIG. 4 is a sectional view of a part of a union head incorporated in the union head embodying the present invention, in a state before the fitting of a seat member;

FIG. 5 is a sectional view of a seat member;

FIG. 6 is a sectional view of a part of the union head as shown in FIG. 4, in the state after the fitting of the seat member;

DESCRIPTION OF THE PREFERRED EMBODIMENT

Figure 7:
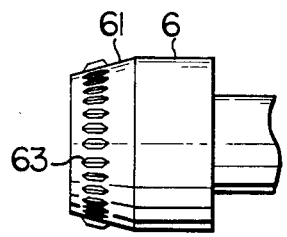
FIG. 7 is a side elevational view of a flaring tool having knurling teeth.
Figure 8:
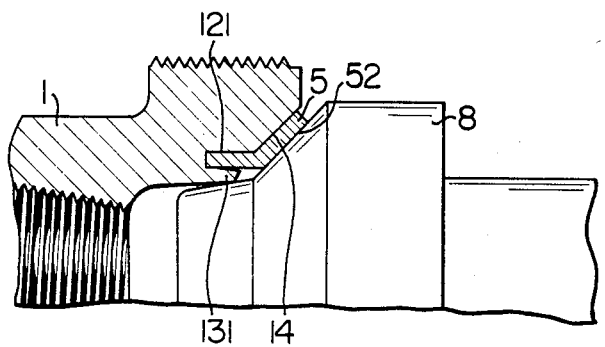
FIG. 8 is a sectional view of a part of the union head, as shown in FIG. 6, in the state after the caulked seat member.
Figure 11:
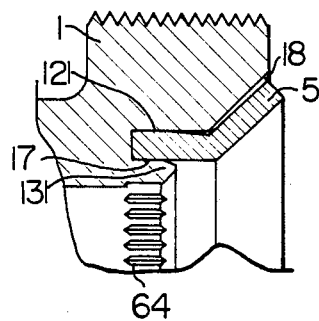
FIG. 11 is an enlarged view of a union head in the union joint in accordance with the invention.

A preferred embodiment of the invention will be described hereinunder with reference to the accompanying drawings. Referring to FIG. 4, an annular groove 121 having a substantial axial length or depth is formed in the front end portion 11 of a union head 1 adjacent to the inner peripheral surface thereof. The larger diameter side of the groove 121 is cylindrical, while the smaller diameter side thereof is inclined toward the inner peripheral end. A cylindrical seat member 5 having a ring-like form as shown in FIG. 5, made from a non-ferrous metallic material, is placed in this annular groove 121, such that the portion of the seat member 5 presenting a sealing surface 52 projects out from the annular groove 12 as will be seen from FIG. 6. In this case, since the seat member 5 fits in the groove 12 over the entire circumference of the latter, the fit between the seat member 5 and the annular groove 121 may be loose. After the seat member 5 has been inserted into the annular groove 121 in this way, the knurlings 64 are formed on the inner peripheral side of the inner wall 131 as shown in FIG. 11 by means of pressing the flaring tool 6 provided on its tapered surface 61 with the knurling teeth 63 over the whole circumference thereof as shown in FIG. 7. Since by means of forming the knurlings 64 on the inner peripheral side of the inner wall 131 a multiplicity of jogs are formed on the inner peripheral side of the inner wall 131 over its whole circumference—as differenciated from a case where the inner wall 131 is flared merely by flaring or bending action without forming the knurlings on the inner peripheral side thereof—, the inner wall 131 can be securely flared by plastic deformation with a small force while avoiding a spring back phenomenon in which the deformation of the inner wall 131 would be slightly restored to its original state. Further, since the smaller diameter side 19 of the annular groove 121 is inclined toward the inner peripheral end, the inner peripheral surface is caulked successively from the bottom side of the annular groove 121, so that the problem of crack formation in the inner wall 131 and the problem of gas leaks along the fitting portion of the annular groove can be completely eliminated. Subsequently, the portion of the seat member 5 projecting out of the annular groove 121 is flared or expanded radially outwardly by another flaring tool 8 shown in FIG. 8, such that the flared inner peripheral surface of the seat member 5 constitutes a seat surface 52. The flaring tool 6 for flaring and caulking the inner wall 131 and the flaring tool 8 for expanding the seat member 5 may be prepared and applied separately or, alternatively, the caulking and the expansion are effected simultaneously in one action using a flaring tool 8 which has separate tapered surfaces for effecting the caulking and expansion.

In the described embodiment of the invention, since the seat member 5 is securely held by caulking over the entire surface of the annular groove, the undesirable back side leak of the internal fluid along the back surface of the seat member is completely eliminated. In addition, the cracking in the seat member or in the inner wall 131, which is often caused in the conventional union joint to allow the leak of fluid, as well as the drop of the seat member from the annular groove, is avoided because the inner wall 131 is uniformly caulked by a uniform caulking force over the entire circumference.

The seat member 5, which is comparatively soft, tends to be scratched as a result of sliding contact with the wall of the annular groove during insertion. The scratch in the seat member may cause the undesirable back side leak. In order to avoid this problem, according to the invention the surface of the inner wall 131 defining the annular groove is slightly tapered or opened as at 19, thereby to facilitate the insertion of the seat member into the annular groove 121 to eliminate any scratching. In addition, with this arrangement the bottom surface of the annular groove makes a tight contact with the seat member during the flaring of the inner wall of the annular groove over the entire circumference, so that the prevention of the back side leak is further ensured. That is, when the inner wall 131 of the annular groove is flared over its whole inner surface, since the seat member is securely caulked successively from the bottom side of the annular groove, a back side leak never occurs. Furthermore, since the innermost bottom portion 17 (see FIG. 11) of the annular groove is caulked over the entire circumference of the seat member, the portion of the seat member presenting the sealing surface is tensed uniformly to leave a slight gap 18 between the body of the union head and the seat member. However, the back side leak through this gap 18 is prevented thanks to the caulking of the wall of the groove 121 onto the seat member 5. In addition, the seat member 5 exhibits a certain resiliency to ensure a close and tight contact with the sealing surface of the union tail piece without causing substantial change in the circular form of the seat member when the union nut is screwed tightly, thereby to ensure a sufficient tightness of the seal on the sealing surfaces.

Figure 9:
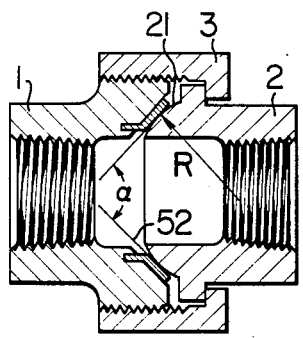
FIG. 9 is a diagram showing the relationship between the taper angle of the seat surface and the leak-proof performance.

An experiment was conducted using a union joint as shown in FIG. 9, varying the taper angle of the seat surface of the union head 1 contacting the sealing surface 21 of the union tail piece in six stages between 90° and 115°, while gradually increasing the tightening torque on the nut 3 to seek for the condition for preventing the leak of the fluid. The result of this experiment is shown in Tables 1, 2 and 3 below. More specifically, three test union joints were used for each taper angle. The conditions which can stop the leakage of fluid in two test union joints out of three are represented by OK as being acceptable, while the conditions which could stop the leakage only in one test union joint out of three are shown by NG as being unacceptable. Air of 71.4 psi was confined in the joint as the internal fluid. Three nominal sizes of joint, i.e. $\frac{1}{2}''$, $\frac{3}{4}''$ and $1''$ were used. The radii of sphere parts constituting the sealing surface 21 on the union tail piece 2 were 0.728 inch, 0.921 inch and 1.098 inch respectively, in the joints of nominal sizes of $\frac{1}{2}''$, $\frac{3}{4}''$ and $1''$.

TABLE 1

Condition for joint of nominal size $\frac{1}{2}$ inch
R = 0.669 to 0.787 inch (0.728 inch)

| Torque lb-inch | Flare angle (degree) | | | | | |
|---|---|---|---|---|---|---|
| | 90 | 95 | 100 | 105 | 110 | 115 |
| 86.7 | NG | NG | NG | NG | NG | NG |
| 173.4 | NG | NG | OK | NG | NG | NG |
| 260.2 | NG | OK | OK | OK | NG | NG |
| 346.9 | OK | OK | OK | OK | OK | OK |
| 433.6 | OK | OK | OK | OK | OK | OK |
| 520.3 | OK | OK | OK | OK | OK | OK |

TABLE 2

Condition for joint of nominal size $\frac{3}{4}$ inch
R = 0.827 to 0.945 inch (0.921 inch)

| Torque lb-inch | Flare angle (degree) | | | | | |
|---|---|---|---|---|---|---|
| | 90 | 95 | 100 | 105 | 110 | 115 |
| 260.2 | NG | NG | NG | NG | NG | NG |
| 346.9 | NG | NG | NG | NG | NG | NG |
| 433.6 | NG | NG | OK | OK | NG | NG |
| 520.3 | NG | OK | OK | OK | OK | NG |
| 607.0 | OK | OK | OK | OK | OK | NG |
| 693.7 | OK | OK | OK | OK | OK | OK |
| 780.5 | OK | OK | OK | OK | OK | OK |
| 867.2 | OK | OK | OK | OK | OK | OK |

TABLE 3

Condition for joint of nominal size $1''$
R = 1.024 to 1.220 inch (1.098 inch)

| Torque Kg-m | Flare angle (degree) | | | | | |
|---|---|---|---|---|---|---|
| | 90 | 95 | 100 | 105 | 110 | 115 |
| 5 | NG | NG | NG | NG | NG | NG |
| 6 | NG | NG | NG | NG | NG | NG |
| 7 | NG | NG | OK | NG | NG | NG |
| 8 | NG | OK | OK | OK | NG | NG |
| 9 | NG | OK | OK | OK | NG | NG |
| 10 | NG | OK | OK | OK | OK | NG |
| 11 | OK | OK | OK | OK | OK | OK |
| 12 | OK | OK | OK | OK | OK | OK |
| 13 | OK | OK | OK | OK | OK | OK |
| 14 | OK | OK | OK | OK | OK | OK |

From the result of this experiment, it is understood that the tapered angle α of the sealing surface preferably ranges between 95° and 110° rather than conventional value 90°, in order to stop the leakage with a small tightening torque.

Figure 10:
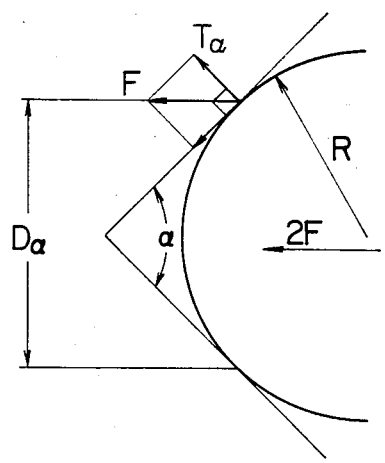
FIG. 10 is a chart for explaining the contact pressure per unit surface.

This fact is proved also theoretically, as will be understood from the following description taken in conjunction with FIG. 10. Namely, assuming here that the axial force 2F produced by the tightening torque is unchanged, the contact surface pressure $T_\alpha$ acting normally to the seat surface is gradually decreased as the taper angle α is increased, so that the sealing performance is impaired due to a reduction in the contact pressure on the sealing surface. On the other hand, however, if the radius R of the sphere part 21 is unchanged, the diameter Dd (see FIG. 10) of the circle of contact between the sealing surface 21 and the seat surface 52 is decreased as the taper angle α of the seat surface 52 is increased. Consequently, the area of the annular contact surface between the sealing surface 21 and the seat surface 52 is decreased. As a result, the contact pressure per unit contact area is increased to provide a higher sealing power, i.e. an increased resistance against the leak of the internal fluid. It is considered also that the affinity of the sealing surface 21 on the union head to the seat member of non-ferrous metallic material is enhanced to produce a high sealing effect within the range of taper angle α of between 95° and 110° due to the factors such as the hardness of the seat surface and the friction coefficient. The highest sealing power attained with the taper angle α falling within the range of between 95° and 110° is attributable to the three reasons explained hereinbefore.

To explain in more detail, the contact pressure per unit area as obtained when the taper angle α is 90° will be compared with that obtained when the taper angle α is 110°.

Representing the axial force applied to the upper half part of the seat surface by F, the force $T_\alpha$ normal to the seat surface is expressed by the following formula.

$$T_\alpha = F \sin \frac{\alpha}{2}$$

On the other hand, the diameter Dd of the circle of contact between the sealing surface on the union tail piece and the seat surface is given by $Dd = 2R \cos \alpha/2$, where R represents the radius of the sealing surface on the union tail piece. The circumferential length $L_\alpha$ of contact circle, therefore is expressed by $L_\alpha = 2\pi R \cos \alpha/2$. This length is regarded as being the theoretical contact area.

The contact pressure $P_\alpha$ per unit area, therefore, is given by the following formula:

$$P_\alpha = T_\alpha/L_\alpha = F/\sin \frac{\alpha}{2} \times \frac{1}{2\pi R \cos \frac{\alpha}{2}}$$

$$\frac{F}{2\pi R} \tan \frac{\alpha}{2}$$

When the taper angle α is 90°, the contact pressure is expressed b $P_{90°} = F/2\pi R \tan 45°$, whereas, when the angle α is 110°, the contact pressure is expressed by $P_{110°} = F/2\pi R \tan 55°$. Since the value of tan 55° is greater than that of tan 45°, the contact pressure $P_{110°}$ is apparently greater than $P_{90°}$. This provides a theoretical support to the fact that a greater sealing power is obtained when the taper angle α ranges between 95° and 110° than when the same is 90°.

As will be fully understood from the foregoing description, according to the invention, it is possible to obtain a union joint having the highest overall sealing performance to offer various advantages in the field of industry concerned.

Although the invention has been described through specific terms, it is to be noted here that the described embodiment is not exclusive and various changes and modifications may be imparted thereto without departing from the scope of the invention which is limited solely by the appended claims.

What is claimed is:

1. A union joint comprising a union head having a male screw thread formed on the outer peripheral surface of an axial inner end portion thereof and provided at its end with an annular seat member made of a non-ferrous material, a union tail piece having a collar on the outer peripheral surface of the inner axial end thereof and provided at its end with a spherical sealing surface, and a union nut provided at its front inner portion with a female screw thread and at its rear inner periphery with an inwardly projecting jaw, said union nut being adapted to be screwed to said union head through screwing engagement between said female screw in said union nut and said male screw on said union head while keeping said jaw of said union nut in engagement with said collar of said union tail piece thereby to bring said seat member on said union head and said sealing surface on said union tail piece into close contact with each other, said union head being provided in its axially inner end portion adjacent to its inner periphery with an annular groove directed axially outwardly, the large diameter side of which is cylindrical and the smaller diameter side of which is inclined toward the inner periphery, said annular seat member being inserted into said annular groove and being caulked in said annular groove by means of knurlings formed on an inner peripheral side of the inner wall of said annular groove over its whole circumference, and wherein an angle of the annular seat member's surface contacting the sealing surface of said union tail piece is formed in a taper angle of between 95° and 110° diverging toward the axially inner end of said union head.

* * * * *